United States Patent [19]

Reedy et al.

[11] 4,261,848

[45] Apr. 14, 1981

[54] ALKOXYSILOXANE HYDRAULIC FLUIDS

[75] Inventors: James D. Reedy, New Fairfield, Conn.; Jerome Henegar, New Metamoras, Ohio

[73] Assignee: Union Carbide Corporation, New York, N.Y.

[21] Appl. No.: 579,600

[22] Filed: May 21, 1975

Related U.S. Application Data

[63] Continuation-in-part of Ser. No. 483,378, Jun. 26, 1974, abandoned.

[51] Int. Cl.$^3$ .......................... C10M 3/46; C10M 3/44
[52] U.S. Cl. ..................................... 252/78.3; 556/457
[58] Field of Search .................. 252/78, 49.6, 78.3; 260/448.8 R; 556/457

[56] References Cited

U.S. PATENT DOCUMENTS

| Re. 25,727 | 2/1965 | Haluska | 260/448.2 B |
|---|---|---|---|
| 2,415,389 | 2/1947 | Hunter et al. | 260/448.8 R |
| 2,624,749 | 1/1953 | Bunnell | 260/448.8 R |
| 2,909,549 | 10/1959 | Bailey | 260/448.8 R |
| 2,917,480 | 12/1959 | Bailey et al. | 260/448.2 R |
| 3,317,428 | 5/1967 | Pater | 252/75 |
| 3,389,088 | 6/1968 | Schar et al. | 252/73 |
| 3,821,114 | 6/1974 | Brown | 260/448.8 R |
| 3,833,505 | 9/1974 | Brown | 252/78 |

OTHER PUBLICATIONS

Morrison & Boyd, *Organic Chemistry*, Allyn and Bacon Inc., Boston, 1959, p. 305.
Handbook of Chemistry & Physics, 44th Ed., Chemical Rubber Publishing Co., Cleveland, Ohio, 1961, pp. 1034–1035.

*Primary Examiner*—Harris A. Pitlick
*Attorney, Agent, or Firm*—Eugene C. Trautlein

[57] ABSTRACT

This invention relates to alkoxysiloxanes characterized by alkoxy endblocking groups derived from alcohols having boiling points and solidification points in particular ranges. The novel alkoxysiloxanes are especially useful as hydraulic fluids (e.g., brake fluids).

1 Claim, No Drawings

ALKOXYSILOXANE HYDRAULIC FLUIDS

CROSS REFERENCE TO RELATED APPLICATION

This application is a continuation in-part of U.S. Patent Application Ser. No. 483,378, filed June 26, 1974, now abandoned.

BACKGROUND OF INVENTION

Glycol ethers are widely used as hydraulic fluids, especially as brake fluids. One disadvantage of glycol ethers in such systems is their relatively high viscosities at low temperatures (e.g., −40° F.) which results in poor response of the system at low temperatures. Another disadvantage of glycol ethers is their tendency to absorb water. Water so absorbed tends to volatilize at high temperatures causing the hydraulic system to "vapor lock".

It has been proposed to employ various organosilicone materials as hydraulic fluids in lieu of glycol ethers. However, organosilicone materials have not proven particularly satisfactory as hydraulic fluids to date. By way of illustration, silicone oils [i.e., materials having the formula $Me_3SiO(Me_2SiO)_xSiMe_3$] tend to shrink SBR rubber gaskets often present in hydraulic systems with resulting leakage of the silicone oil from the system. Moreover, silicone oils have relatively poor lubricity for the metals conventionally used in hydraulic systems and hence relatively high wear is encountered when silicone oils are employed in such systems. As a further illustration amino-organosilicones have been proposed as hydraulic fluids. However, such materials are relatively expensive and have relatively low wet boiling points which is indicative of a tendency of hydraulic systems containing such materials to vapor lock at high temperatures under humid conditions.

SUMMARY OF THE INVENTION

This invention provides liquid alkoxysiloxanes represented by the average formula:

$$RO(Me_2SiO)_nR \qquad (I)$$

wherein Me is methyl group, n has a value from 5 to 200 (preferably from 10 to 50) and R is a mixture of monovalent hydrocarbon groups having at least 10 carbon atoms per average group, said groups being derived by removal of the hydroxyl groups from a mixture of alcohols that has the average formula ROH, that has a boiling point above 100° C. at atmospheric pressure and that solidifies only below −20° C.

This invention further provides a process for effecting movement of a movable member within enclosing chamber consisting of transmitting pressure to the movable member through a liquid medium comprising alkoxysiloxane represented by formula (I). In a preferred embodiment, this invention provides a process for transmitting force from the brake pedal means of a vehicle through hydraulic line means connected to master brake cylinder means and to activated means comprising filling said hydraulic means, said master cylinder means and said activated means with alkoxysiloxane represented by formula (I).

Description of the Invention

The alkoxysiloxanes of this invention are conveniently prepared by reacting a dimethylsiloxane hydrolyzate with a suitable mixture of alcohols in the presence of a basic catalyst (e.g., potassium hydroxide) and aromatic solvent (e.g., xylene) at an elevated temperature (e.g., from 100° to 150° C.). The dimethylsiloxane hydrolyzate employed in producing the alkoxysiloxanes of this invention can be prepared by the hydrolysis of dimethyldichlorosilane in the presence of hydrochloric acid by conventional techniques. The hydrolyzate so produced consists of a mixture of cyclic dimethylsiloxanes and linear hydroxyl endblocked dimethylsiloxanes. The alcohol mixture used in producing alkoxysiloxane for this invention can be prepared by a two-step process. The first step is the oxo (hydroformulation) reaction of olefins with carbon monoxide and hydrogen at high temperatures and pressures to produce an aldehyde mixture intermediate. The second step is the hydrogenation of the intermediate to produce the alcohol mixture. This two-step process produces mixtures of alcohols (e.g., mixtures of isomeric isodecanols and mixtures of isomeric tridecanols). Preferably, the alcohol mixtures have an average of from 10 to 18 carbon atoms (most preferably from 10 to 14 carbon atoms), per average alcohol molecule.

The alkoxysiloxanes of this invention can be employed as such as hydraulic fluids. Preferably alkoxysiloxanes are employed as mixtures containing a minor amount of unreacted alcohols. Such mixtures desirably contain from 70 to 98 parts by weight of the alkoxysiloxane and from 30 to 2 parts by weight of unreacted alcohols per 100 parts by weight of the siloxane and alcohol mixtures. Such unreacted alcohol imparts improved rubber swell and improved lubricity and aids in solubilizing polar additives. Other materials can also be employed along with the alkoxysiloxane or alkoxysiloxane-alcohol mixture (e.g., aromatic oils as diluents and neoprene swell additives, corrosion inhibitors, high boiling esters as diluents, etc.).

Other uses of the alkoxysiloxanes of this invention are as fiber lubricants and mold release coatings in the molding of plastic parts.

TEST PROCEDURES

In the Examples appearing below, the following test procedures were used.

A. SAE J 1703 Tests

SBR Rubber Swell Test—A brake cylinder cup made of SBR rubber is immersed in 75 milliliters of the fluid being tested and the fluid is then heated for 70 hours at 248° F. The diameter of the cup is measured before and after the test. The fluid is considered to have passed this test if the change in cup diameter is between 0.006 and 0.055 inch.

Stroke Test—The fluid being tested is used as the hydraulic fluid in a brake system operated at 1000 strokes per hour at 248° F. for a total of 85,000 strokes and the various measurements listed in Table I below are made. The fluid is rated as "satisfactory" or "unsatisfactory" depending upon its overall performance based on these measurements.

Corrosion Test—Sepcimens of various metals are immersed in fluid being tested to which 5 wt-% water has been added. The fluid is maintained at 100° C. for five days. The specimens are weighed before and after the test and the weight loss of the specimens in milligrams per centimeter is calculated. The fluid is considered to have passed this test when the appearance of the metals is not pitted and when the weight loss of the metals does not exceed the indicated values:

| Metal | Maximum Weight Loss (mg/cm²) |
| --- | --- |
| Cast Iron | 0.2 |
| Steel | 0.2 |
| Brass | 0.4 |
| Copper | 0.4 |
| Tin | 0.2 |
| Aluminum | 0.1 |

Rubber Cup Test—The Shore hardness of the SBR rubber cup is measured before and after the SBR Rubber Swell Test described above. The fluid is considered to have passed this test when the decrease in Shore hardness does not exceed 15 Shore units.

Humidification Test—The fluid being tested (100 cc) and a control of "SAERM-1" glycol ether brake fluid (100 cc) are maintained under a relative humidity of 80% until the glycol ether has absorbed 3 wt-% water from the air. The amount of water absorbed by fluid being tested ("water takeup") is then measured by titration by the Karl Fischer method. The boiling point ("Wet Boiling Point") of the fluid being tested is then determined. SAE J 1703 glycol ether type brake fluids generally have a Wet Boiling Point of about 285° F. The J 1703 fluid is considered to have passed this test when its Wet Boiling Point is above 284° F.

Lip Diameter Test—The diameter of the SBR rubber cup is measured before and after the Stroke Test described above. The lip diameter interference set of the rubber cup is then calculated according to the equation:

$$S = \frac{D_1 - D_2}{D_1 - D_3} \times 100$$

wherein S is the set, $D_1$ and $D_2$ are the initial and final rubber cup diameters respectively and $D_3$ is the original brake cylinder bore diameter. This fluid is considered to have passed this test when the set does not exceed 65%.

Viscosity—The viscosity of the fluid being tested is measured at 210° F. and −40° F. This fluid is considered to have passed this test when its viscosity is at least 1.5 centistokes at 211° F. and no greater than 1800 centistokes at −40° F.

B. Other Tests

Neoprene Rubber Swell Test—A one-inch square test specimen of neoprene rubber is immersed in 75 milliliters of the fluid being tested. The fluid is then heated for 70 hours at 212° F. The volume swell of the rubber is calculated as follows:

$$\text{Volume Swell} = \frac{A - B}{B} \times 100$$

wherein A is the difference between the weight of the specimen in air and the weight of the specimen in water after the test and B is the difference before the test. The fluid is considered to have passed this test when the volume swell is between −3 and +20%.

Neoprene Hose Test—A neoprene rubber hose is immersed in 250 milliliters of the fluid being tested and then the fluid is maintained at 100° C. for 70 hours. The fluid is drained and the hose is maintained at −40° F. for 24 hours. The hose is then bent around a 3.0 inch mandrel and is inspected for any signs of cracking.

Vapor Lock Test—This test is conducted in a Markey Vapor Lock Test Indicator which consists of a heating unit and a test fluid container. The fluid being tested is placed in a container and heated slowly. The temperature at which the fluid reaches a fixed level in the container is the "Vapor Lock Temperature" of the fluid. In the Examples appearing below, this test was performed on fluids after the Humidification Test. A conventional glycol ether has a Vapor Lock Temperature of 270° F. under these conditions.

STARTING MATERIALS

In the Examples appearing below, the following starting materials are used:

Dimethylsiloxane Hydrolyzate: This starting material is prepared by the hydrolysis of dimethyldichlorosilane with concentrated hydrochloric acid at a temperature from 80° to 90° C. The resulting intermediate is a mixture of cyclic dimethylsiloxanes and chloro endblocked dimethylsiloxanes. The intermediate is neutralized using aqueous base at a temperature from 70° to 90° C. The product so obtained is washed with water to produce the dimethylsiloxane hydrolyzate which has a viscosity from 18 to 30 centistokes at 25° C. and a hydroxyl content from 0.5 to 1.0. The hydrolyzate consists of about 50 wt-% cyclic dimethylsiloxanes and about 50 wt-% hydroxyl endblocked dimethylsiloxanes.

Tridecanol Mixture: This starting material is a mixture of alcohols produced by the conventional oxo and reduction processes. The mixture of alcohols consists of about 5 wt-% $C_{11}$ alcohols, 20 wt-% $C_{12}$ alcohols, 64 wt-% $C_{13}$ alcohols and 10 wt-% $C_{14}$ alcohols. The alcohols are highly branched primary alcohols. The alcohol mixture has a boiling point of 257.6° C. at atmospheric pressure and a pour point of −40° F. (−40° C.).

Isodecanol Mixture: This starting material is a mixture of alcohols produced by the conventional oxo and reduction processes. The alcohols in this mixture have an average of about 10 carbon atoms and are highly branched primary alcohols. This alcohol mixture has a boiling point of 220° C. at atmospheric pressure and becomes glassy at −60° F. (−51° C.).

ABBREVIATIONS

In the Examples appearing below, the following abbreviations are used:

| Abbreviations | Meaning |
| --- | --- |
| Aromatic Oil I | A naphthenic neutral oil having a viscosity of 2.7 to 3.2 cstks at 100° F. and a flash point of 200° F. |
| Bu | butyl |
| °C. | degree Centigrade |
| cm | centimeters |
| cstks | centistokes |
| °F. | degree Fahrenheit |
| g | gram |
| in | inches |
| Isodecyl ($C_{10}H_{21}$) | A mixture of isomeric decyl groups derived from the above-described isodecanol mixture by removal of the hydroxyl groups |
| max | maximum |
| Me | methyl |
| mg | milligram |
| ml | milliliter |
| % | percent by weight |

| Abbreviations | Meaning |
|---|---|
| SBR | Styrene-butadiene rubber |
| sparge | pass nitrogen gas through a liquid to aid in volatilization of volatile materials |
| strip | remove volatile materials from a liquid by heating the liquid at reduced pressure |
| Tridecyl ($C_{13}H_{27}$) | A mixture of isomeric tridecyl groups derived from the above-described tridecanol mixture by removal of the hydroxyl groups |
| visc | viscosity |
| V.T.C. | Viscosity-Temperature Coefficient = $1 - \left[ \frac{visc(cstks)\ at\ 210°\ F.}{visc(cstks)\ at\ 100°\ F.} \right]$ |

The following Examples illustrate the present invention.

EXAMPLE I

The reaction vessel consisted of a 500 ml three-necked flask equipped with a Dean-Stark trap water condenser combination, a mechanical stirrer and an automatic temperature controller. To the flask was added 225 g of a dimethylsiloxane hydrolyzate, 75 g of tridecanol mixture, 1.5 g of KOH and 50 ml of xylene. The reactants were heated to 150° C. and a xylene-water azeotrope was removed over a period of 3 hours. The crude product so produced was cooled, neutralized with $H_2CO_3$ and filtered to yield an alkoxysiloxane of this invention, having an average formula:

$C_{13}H_{27}O(Me_2SiO)_{11.5}C_{13}H_{27}$

The volatile components (the xylene and small amounts of unreacted hydrolyzate and alcohol) were removed uncer vacuum at 150° C.

The properties of a typical product produced by the process of this Example are as follows:

| Boiling Point, °F. | >600 |
|---|---|
| SBR Rubber Swell | 0.024 in. (−9 Shore units) |
| Viscosity at: | |
| 210° F. | 8.0 cstks |
| 100° F. | 22.9 cstks |
| −40° F. | 430 cstks |
| −60° F. | 969 cstks |
| Stroke Test | Satisfactory (see Example V) |
| Corrosion Test | |
| Appearance, (wt. loss, mg/cm²) | |
| Cast Iron | Bright (+0.03) |
| Steel | (0.0) |
| Brass | Very slight stain (0.00) |
| Copper | Moderate stain (0.04) |
| Tin | Bright (0.0) |
| Aluminum | Bright (0.0) |
| % Sediment | 0.03 |
| Condition of Rubber Cup | |
| Swell (Inches) | 0.021 |
| Shore Loss | 6 |
| Humidity Test | |
| Water Up-Take | None |
| Wet Boiling Point | >650° F. |

EXAMPLE II

To a two-liter, three-necked flask was added 750 g of dimethylsiloxane hydrolyzate and 250 g of isodecanol mixture. The flask was equipped with a Dean-Stark trap, water condenser, stirrer and automatic temperature controller. To the flask was added 90 ml of xylene and 5 g (0.5%) KOH catalyst. The reaction vessel was heated to 150° C. and sparged to aid in the removal of the water-xylene azeotrope. After three hours the catalyst was neutralized and the crude product cooled and filtered. The product was stripped to remove the xylene and unreacted hydrolyzate. The product consisted of 96.3% of an alkoxysiloxane of this invention that had the average formula:

$C_{10}H_{21}O(Me_2SiO)_{10}C_{10}H_{21}$ and 3.7% of unreacted isodecanol mixture. The product had a pH of 7.7 in a 50%-50% water-isopropanol mixture at 10% concentration. The product viscosity of 100° F. was 12.5 cstks and 4.9 cstks at 210° F. which corresponds to a Viscosity-Temperature Coefficient of 0.61. The product did not freeze at −40° C.

EXAMPLE III

The procedure in this Example was the same as that of Example II. The amount of dimethylsiloxane hydrolyzate used was 625 g, and the amount of isodecanol mixture used was 375 g. After filtration and removal of the volatile components the product weighed 879 g. The product pH was 7.1 in water-isopropanol. The product viscosity at 100° F. was 8.7 cstks and 3.1 cstks at 210° F. corresponding to a Viscosity-Temperature Coefficient of 0.64. The product was fluid below −40° C. The product consisted of 9% unreacted isodecanol mixture, 5% unreacted hydrolyzate and 86% alkoxysiloxane of this invention having the average formula:

$C_{10}H_{21}O(Me_2SiO)_{8.2}C_{10}H_{21}$

EXAMPLE IV

This Example relates to an alkoxysiloxane outside the scope of the present invention because the freezing point of the n-decanol reactant is too high (i.e., 6° C.). n-Decanol and dimethylsiloxane hydrolyzate were reacted using the same mole ratio of reactants as in Example II. The resulting product had a Viscosity-Temperature Coefficient of 0.62 and froze while being cooled for a −40° F. viscosity measurement. The product consisted of 7% unreacted hydrolyzate and 93% alkoxysiloxane having the average formula:

$CH_3(CH_2)_9O(Me_2SiO)_{10.4}(CH_2)_9CH_3$

EXAMPLE V

Table I below shows a comparison of the simulated service performance test (Stroke Test) results obtained on: (1) the alkoxysiloxane of this invention produced as described in Example I above, and (2) a conventional silicone oil having a viscosity of 100 cstks at 25° C. and having the average formula:

$Me_3SiO(Me_2SiO)_{48}SiMe_3$

The one significant difference noted between the two siloxanes in these tests is in the degree of lip diameter interference set of the wheel cylinder rubber cups. The alkoxysiloxane of Example I with a lip set of 17% readily meets the SAE maximum requirement of 65% whereas the conventional silicone oil was slightly over the maximum requirement with 66% lip set. There was also more wheel cylinder rubber cup heel abrasion noted with the conventional silicone oil as compared to the alkoxysiloxane of Example I.

TABLE I

| Stroke Test (Simulated Service Performance) | SAE J1703 Requirements | Siloxane of Example I | Conventional Silicone Oil |
|---|---|---|---|
| Corrosion of metal parts as evidenced by pitting | none | none | none |
| Change in initial diameter of any cylinder or piston (in.) | 0.005 (max.) | none | none |
| Lip diameter interference set of rubber cups[a] | | | |
| Wheel cylinder, max. | 65% | 17% | 66% |
| Primary, max. | 65% | 72% | 81% |
| Decrease in Shore Hardness of rubber cups: | | | |
| Wheel cylinder, max. (%) | 15 | 2 | 5 |
| Primary, max. (%) | 15 | 11 | 6 |
| Operating condition of rubber cups as evidenced by excessive scoring scuffing, blistering, cracking, chipping or change in shape (S denotes satisfactory) | S | S | S[b] |
| Vol. % sediment in fluid drainer from wheel cylinders | 1.5 (max.) | 0.7 | 0.5 |
| Vol. % sediment in fluid drained from master cylinder | 1.5 (max) | 0.6 | 0.3 |

[a]There are two cups : one in the wheel cylinder and one in the master cylinder.
[b]light chipping of the heel of the cup.

EXAMPLE VI

Listed in Table II below are the physical properties of, and the test results obtained on, various alkoxysiloxanes of this invention (i.e., the siloxanes listed in runs 6 to 9 in Table II). For purpose of comparison, the other runs list properties and results pertaining to other siloxanes and siloxane mixtures. As compared to the alkoxysiloxanes of this invention, the other siloxanes and siloxane mixtures exhibited one or more inferior properties, i.e., freezing or higher viscosities at $-40°$ F. (see runs 1, 2 and 11 to 16), excessive SBR rubber swell (see runs 2, 10 and 26), phase separation (see runs 4, 5 and 13) and lower Wet Boiling Points (see runs 1 to 4, 13, 15 and 17 to 26). The alkoxysiloxane of this invention of run 6 caused cracking of the hose in the Neoprene Hose Test which can be corrected by adding a minor amount (e.g., 7.5 wt-%) of Aromatic Oil I to that alkoxysiloxane.

TABLE II

| | | | Viscosity | | SBR Rubber | Humidification Test | |
|---|---|---|---|---|---|---|---|
| Run | Siloxane | % Me$_2$SiO | 210° F. (CSTKS) | $-40°$ F. (CSTKS) | Swell (in.) | Water Take Up (%) | Wet Boiling Pt. (°F.) |
| 1.* | 90% Siloxane A (1) 10% tridecanol | 90 | 22.2 | 1891 | .009 | 0.14 | 500 |
| 2. | RO(Me$_2$SiO)$_{10.5}$R  R = Bu(OC$_3$H$_6$)$_{5.6}$— | 50 | 10.5 | 1079 | .067 | .47 | 350 |
| 3. | RO(Me$_2$SiO)$_{15}$R  R = Bu(OC$_3$H$_6$)$_{2.6}$— | 72 | 8.8 | 301 | .024 | 0.14 | 460 |
| 4. | RO(Me$_2$SiO)$_{12.4}$R  R = BuOC$_2$H$_4$OC$_2$H$_4$O— | — | — | 122 | .039 (2) | 0.34 (hazy) | 460 |
| 5. | RO(Me$_2$SiO)$_{7.1}$R  R = Me(OC$_2$H$_4$)$_3$— | 61 | 3.6 | — | 0.043 | two liquid layers | — |
| 6. | RO(Me$_2$SiO)$_{10}$R  R = tridecyl | 66 | 5.6 | 353 | .025 | none | 600 |
| 7. | RO(Me$_2$SiO)$_{12.5}$R  R = tridecyl | 72 | 7.2 | 366 | 0.012 | none | 600 |
| 8. | RO(Me$_2$SiO)$_{10}$R  R = isodecyl | 71 | 4.9 | 168 | .020 | — | — |
| 9. | RO(Me$_2$SiO)$_{5.4}$R  R = isodecyl | 57.4 | 3.1 | 158 | .039 | — | — |
| 10. | RO(Me$_2$SiO)$_{3.1}$R  R = isodecyl | 43.5 | 2.4 | — | .098 | — | — |
| 11. | R$_2$O(Me$_2$SiO)$_{24.5}$T$_{2.2}$ (3)  R = tridecyl | 60 | — | froze | .020 | — | — |
| 12. | R$_2$O(Me$_2$SiO)$_{14.7}$T$_{0.96}$  R = tridecyl | 60 | — | froze | .021 | — | — |
| 13. | R$_2$O(Me$_2$SiO)$_{11.6}$T$_{0.76}$  R = isodecyl | 60 | — | froze | .028 | 0.6 (hazy) | 340 |
| 14. | R$_2$O(Me$_2$SiO)$_{19.1}$T$_{1.7}$  R = isodecyl | 60 | — | froze | .014 | — | — |
| 15. | Me$_3$SiO(Me$_2$SiO)$_9$T$_{0.86}$ | 62.5 | — | froze | 0.10 | 1.0 | 280 |
| 16. | RO(Me$_2$SiO)$_{12}$R  R = n-decyl | 75 | — | froze | .029 | — | — |
| 17.* | 50% Siloxane B (4) 50% Ester I (5) | — | — | — | 0.162 | 0.54 (7) | 320 |
| 18.* | 60% Siloxane B 40% Ester I | — | — | — | 0.147 | 0.57 (7) | 320 |
| 19.* | 70% Siloxane B | | | | | | |

TABLE II-continued

| Run | Siloxane | % Me₂SiO | Viscosity 210° F. (CSTKS) | Viscosity −40° F. (CSTKS) | SBR Rubber Swell (in.) | Water Take Up (%) | Wet Boiling Pt. (°F.) |
|---|---|---|---|---|---|---|---|
| | 30% Ester I | — | — | — | 0.106 | 0.64 (7) | 320 |
| 20.* | 50% Siloxane B 50% Ester II (6) | — | — | — | 0.157 | 0.5 (7) | 320 |
| 21.* | 60% Siloxane B 40% Ester II | — | — | — | 0.139 | 0.57 (7) | 320 |
| 22.* | 70% Siloxane B 30% Ester II | — | — | — | 0.114 | 0.62 (7) | 320 |
| 23.* | 58% Siloxane B 42% Siloxane C (7a) | — | — | 220 | .045 | 1.2 (8) | 350 |
| 24.* | 58% Siloxane B 42% Siloxane D (7b) | — | — | 427 | .034 | 1.6 (8) | 360 |
| 25. | Siloxane E (9) | — | 5.4 | 535 | .044 (10) | 0.4 (11) | 490 (12) |
| 26. | Siloxane F (13) | — | 3.6 | 219 | .070 (14) | 0.9 (11) | 420 (15) |

(1) Siloxane A is HO(Me₂SiO)₄H having a viscosity of 100 centistokes at 25° C.
(2) 4.0 volume % Neoprene swell
(3) T is a siloxane unit having the average formula: MeO(C₂H₄O)₅ ₇(CH₃)₃SiO₁ ₅
(4) Siloxane B is a siloxane having the average formula: Me₃SiO(Me₂SiO)₂[MeO(C₂H₄O)₃C₂H₄SiMeO]₂.₈SiMe₃
(5) Ester I is Me₂Si(OC₈H₁₇)₂
(6) Ester II is Me₂Si(OC₁₀H₂₁)₂
(7) Hazy, ppt
(7a) Siloxane C is a siloxane having the average formula: RO(Me₂SiO)₃.₇(C₂H₄O)₂(Me₂SiO)₃.₇R where R = Me(OC₂H₄)₃—
(7b) Siloxane D is a siloxane having the average formula: RO[(Me₂SiO)₂.₇(C₂H₄O)₂(Me₂SiO)₂.₇]₃R where R = Me(OC₂H₄)₃—
(8) Fluid separation occurred after two days standing
(9) Siloxane E is a siloxane having the average formula: C₁₃H₂₇-O[(Me₂SiO)₃(C₂H₄O)₂]₃.₅Me₂SiOC₁₃H₂₇
(10) 6.5 volume % Neoprene swell
(11) No fluid separation after three weeks standing
(12) Vapor Lock Temperature 450° F.
(13) Siloxane F is a siloxane having the average formula: [MeO(C₂H₄O)₃]₁.₂[(Me₂SiO)₃(C₂H₄O)₂]₃.₇Me₂SiOC13H₂₇
(14) 1.5 volume % Neoprene swell
(15) Vapor Lock Temperature 350° F.
*A mixture of the indicated materials Preferably, the alkoxysiloxanes of this invention are derived from a mixture of alcohols that has a boiling point above 180° C. at atmospheric pressure and that solidifies only below −40° C.

What is claimed is:

1. A liquid alkoxysiloxane represented by the average formula:

(RO(Me₂SiO)$_n$R

wherein Me is a methyl group, n has a value from 10 to 50 and R is a mixture of monovalent hydrocarbon groups having 13 carbon atoms per average group, said groups being derived by removal of the hydroxyl groups from a mixture of isomeric tridecanols that has the formula ROH, that has a boiling point above 100° C. at atmospheric pressure, and that solidifies only below −20° C.

* * * * *

UNITED STATES PATENT AND TRADEMARK OFFICE
CERTIFICATE OF CORRECTION

PATENT NO. : 4,261,848
DATED : April 14, 1981
INVENTOR(S) : J.D. REEDY ET AL.

It is certified that error appears in the above—identified patent and that said Letters Patent is hereby corrected as shown below:

In the claims, claim 1, column 9, the formula which reads "$(RP(Me_2SiO)_nR$" should read -- $RO(Me_2SiO)_nR$ --.

Signed and Sealed this

Thirteenth Day of October 1981

[SEAL]

Attest:

GERALD J. MOSSINGHOFF

Attesting Officer — Commissioner of Patents and Trademarks